(12) United States Patent
Zappella

(10) Patent No.: US 11,599,822 B1
(45) Date of Patent: *Mar. 7, 2023

(54) GENERATION AND USE OF LITERARY WORK SIGNATURES REFLECTIVE OF ENTITY RELATIONSHIPS

(71) Applicant: Amazon Technologies, Inc., Seattle, WA (US)

(72) Inventor: Giovanni Zappella, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 903 days.

This patent is subject to a terminal disclaimer.

(21) Appl. No.: 16/443,477

(22) Filed: Jun. 17, 2019

Related U.S. Application Data

(63) Continuation of application No. 14/657,931, filed on Mar. 13, 2015, now Pat. No. 10,366,343.

(51) Int. Cl.
    *G06N 20/00*      (2019.01)
    *G06F 16/951*     (2019.01)
    *H04L 67/10*      (2022.01)

(52) U.S. Cl.
CPC ........... *G06N 20/00* (2019.01); *G06F 16/951* (2019.01); *H04L 67/10* (2013.01)

(58) Field of Classification Search
CPC . G06F 21/602; G06F 16/951; H04L 2209/38; H04L 9/3236; H04L 67/10; G06N 20/00
See application file for complete search history.

(56) References Cited

U.S. PATENT DOCUMENTS

| | | |
|---|---|---|
| 8,356,248 B1 | 1/2013 | Killalea |
| 8,842,085 B1 | 9/2014 | Goodspeed et al. |
| 9,613,003 B1 | 4/2017 | Goodspeed et al. |
| 9,639,518 B1 | 5/2017 | Goodspeed et al. |
| 2004/0204925 A1* | 10/2004 | Alon ........................ G16B 5/30 715/263 |
| 2008/0215607 A1* | 9/2008 | Kaushansky .......... G06Q 30/02 707/999.102 |
| 2014/0195984 A1 | 7/2014 | Aslam et al. |
| 2014/0379331 A1 | 12/2014 | Allen et al. |
| 2015/0154278 A1 | 6/2015 | Allen et al. |
| 2016/0092512 A1 | 3/2016 | Wu et al. |

OTHER PUBLICATIONS

Hammouda et al. "Efficient Phrase-Based Document Indexing for Web Document Clustering", IEEE Trans KDE, 2004, pp. 1279-1296.*
Schietgat, et al., "Maximum Common Subgraph Mining: A Fast and Effective Approach towards Feature Generation," SRL-MLG-ILP, Leuven, Belgium, 2009 (3 pages).
Su, Hongyu, "Machine learning in molecular classification," Department of Computer Science, University of Helsinki, Finland (17 pages).

* cited by examiner

*Primary Examiner* — Li Wu Chang

(74) *Attorney, Agent, or Firm* — Knobbe, Martens, Olson & Bear, LLP

(57) ABSTRACT

A computer system and process extract information from a literary work regarding relationships between entities (e.g., characters, locations, etc.) described or represented in the literary work, and generate a graph representing these relationships. The graph data is parsed into sub-graphs, and the subgraphs are used to generate a signature of the literary work. The respective signatures of different literary works may be compared for purposes of generating literary work recommendations for users.

22 Claims, 6 Drawing Sheets

GENERATION AND USE OF LITERARY WORK SIGNATURES REFLECTIVE OF ENTITY RELATIONSHIPS

PRIORITY CLAIM

This application is a continuation of U.S. application Ser. No. 14/657,931, filed Mar. 13, 2015, the disclosure of which is hereby incorporated by reference.

BACKGROUND

Systems exist that use simple dimensions to identify books that are similar. For example, the systems can (1) analyze item purchase histories and item viewing histories for a large number of users, (2) compare catalog or bibliographic data (e.g., author, subject, title, etc.) to look for titles with similar attributes, and/or (3) apply traditional collaborative filtering to users' ratings of individual books. However, these existing systems may have trouble identifying similar books when the books are self-published. The number of available self-published books may be large, yet only a small number of users may have viewed or read any given self-published book. Thus, few, if any, self-published books may be rated by enough users to provide meaningful recommendations.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1A:
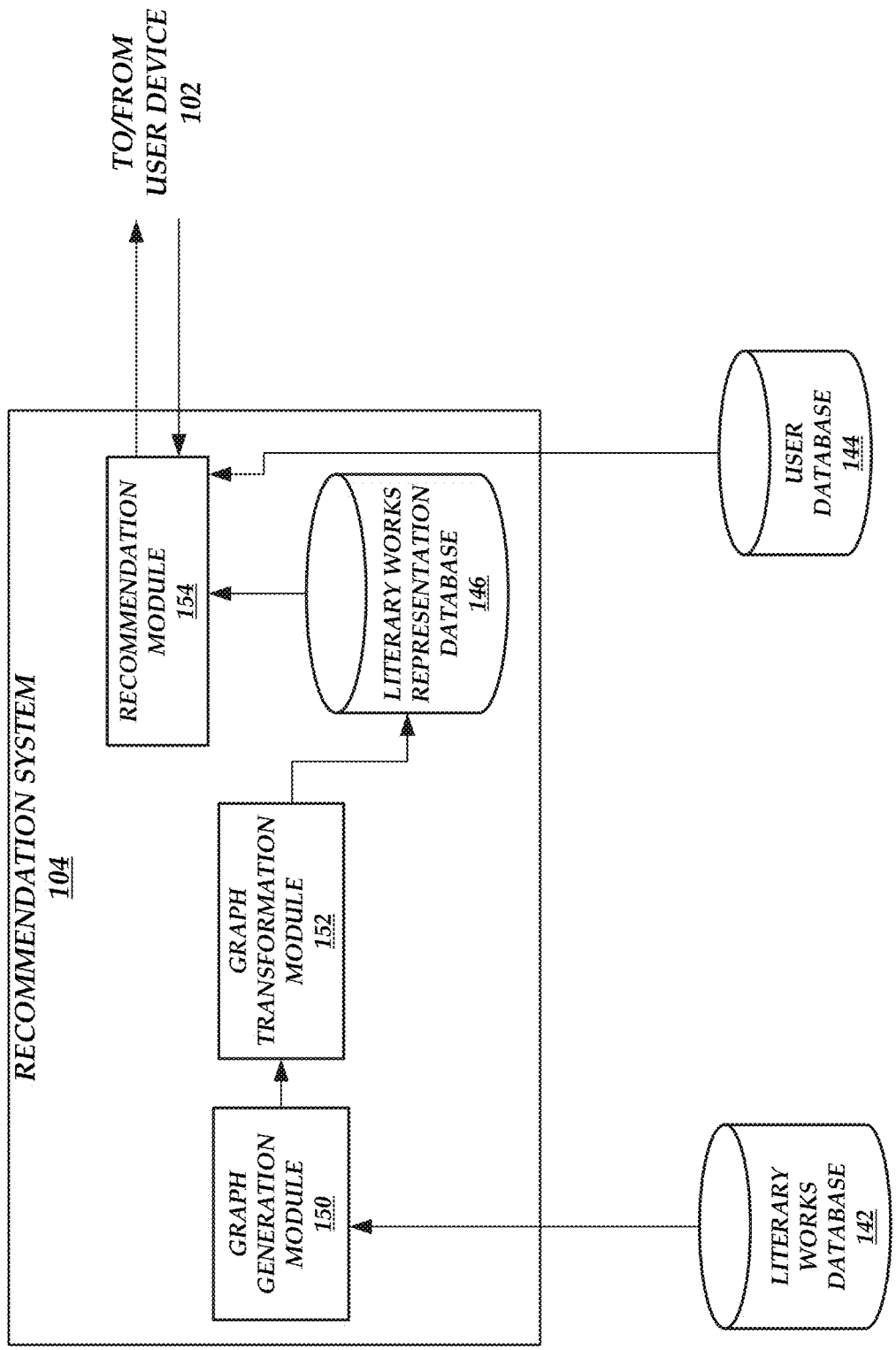
FIG. 1A illustrates various blocks in a literary works recommendation system that can be used to provide a user with a literary works recommendation.

As described above, existing recommendation systems typically generate recommendations of items (including book titles) for users based on the users' purchase histories, item ratings, browse histories, search histories, and/or other types of behaviors. In the context of self-published books or other literary works that are sparsely read, these recommendations typically fail to provide meaningful recommendations due to the lack of users that have read any given work. As a result, the recommendations that include self-published books or other literary works that are sparsely read are frequently not useful to users.

The issues highlighted above with respect to existing recommendation systems may grow in importance as electronic books become more prevalent. The creation and delivery of electronic books requires much less overhead than may be required with traditional hardbound books. Several network-based entities offer self-publishing platforms that allow any user to publish a manuscript and make it available to the public. These users may publish the manuscript without editorial review or any form of quality-check. Thus, network-based systems (e.g., electronic catalog systems) that allow users to read, review, and/or obtain books or other literary works (e.g., poems, white papers, comics, etc.) may be flooded with books or other literary works in which the quality is unknown due to the lack of readership.

To address some of these concerns, the existing recommendation systems can be modified to use, for example, a bag-of-word model. For example, the modified recommendation systems can analyze popular or famous literary works to identify words and/or the frequency of words included in the work. A self-published literary work or other literary work that is sparsely read can then be analyzed in a similar manner, and the analyses can be compared to identify a relative level of quality of the self-published literary work or other literary work that is sparsely read. The identified level of quality can then be used to determine whether the work should be provided as a recommendation. However, the modified recommendation system may introduce further issues. For example, a self-published literary work may include the same types of words or frequency of words as a popular or famous literary work, but this does not necessarily mean that the self-published literary work is written with the same quality as the popular or famous literary work.

Accordingly, the embodiments described herein provide systems and methods that use machine-learning techniques to use information extracted from literary works to rank and/or recommend literary works. For example, as literary works are added to a digital library, the recommendation system described herein can analyze the literary works and extract information such as characters, geographic locations (e.g., actual and/or imaginary geographic locations), and the relationships between characters and/or geographic locations. The information can be extracted using a variety of natural language processing techniques, such as techniques that can be used to identify plot keywords, as is described in U.S. patent application Ser. No. 14/076,692, titled "GENERATING MEDIA RECOMMENDATIONS" and filed on Nov. 11, 2013, which is hereby incorporated by reference herein in its entirety, techniques that can be used to identify proper nouns, as is described in U.S. patent application Ser. No. 13/431,838, titled "IDENTIFYING ENTITIES IN A DIGITAL WORK" and filed on Mar. 27, 2012, which is hereby incorporated by reference herein in its entirety, techniques that can be used to identify noun phrases, as is described in U.S. patent application Ser. No. 13/433,028, titled "IDENTIFYING TOPICS IN A DIGITAL WORK" and filed on Mar. 28, 2012, which is hereby incorporated by reference herein in its entirety, techniques that can be used to identify objects and supplemental information (such as locations of occurrences of the objects), as is described in U.S. patent application Ser. No. 13/425,116, titled "SUPPLEMENTAL INFORMATION FOR A DIGITAL WORK" and filed on Mar. 20, 2012, which is hereby incorporated by reference herein in its entirety, and techniques that can be used to identify other supplemental information (such as information from authoritative sources, character summaries, etc.), as is described in U.S. Pat. No. 8,842,085, titled "PROVIDING SUPPLEMENTAL INFORMATION FOR A DIGITAL WORK" and issued on Sep. 23, 2014, which is hereby incorporated by reference herein in its entirety.

The recommendation system can encode the information extracted from a literary work into one or more graphs, where the nodes and arcs of the one or more graphs form a representation of the extracted information. Various machine-learning techniques, algorithms, or processes, such as linear regressions, logistic regressions, neural networks, and/or the like, and/or any combination thereof (where, if multiple machine-learning techniques are used, the predictions may be aggregated), can be used to generate a signature associated with the literary work (e.g., a representation of the literary work) that is based on various aspects of the literary work's one or more graphs. In some embodiments, the signature is a vector or other such representation, where each entry of the vector corresponds with a specific type of relationship between characters and/or geographic locations.

At some later time, a user may visit a page (e.g., a content page or a network page, such as a web page) that provides information on literary works. Using data associated with the user (e.g., ratings of literary works provided by the user) and the signatures, the page may be personalized for the user with literary work recommendations based on results provided by the recommendation system. For example, the recommendation system can compare the signature of a first literary work rated highly by the user with other signatures. If a signature closely matches the signature of the first literary work, the recommendation system may flag the literary work associated with the closely matching signature as a possible recommendation. The literary work associated with a signature that best matches the signature of the first literary work may be provided to the user as a recommendation. Alternatively, several literary works associated with signatures that closely match the signature of the first literary work can be provided to the user as recommendations in a ranked or unranked order. The literary works may be further parsed and filtered before being provided to the user as recommendations. For example, if two literary works that closely match the signature of the first literary work are written by the same author or are part of the same series (e.g., a trilogy, a volume, etc.), one of the literary works may be removed from the list of literary works recommended to the user (or otherwise hidden from being displayed or presented in the list of literary works recommended to the user) such that the user receives a diverse selection of recommended literary works.

The user may also visit a page that provides a list of recommended literary works (that are, for example, not personalized to the user). For example, the page may rank new literary works, the most popular literary works, and/or the like. The rankings may be based on the determined quality of the literary work (as determined by the recommendation system), and the recommendation system may determine the quality of a literary work based on the literary work's signature. In an embodiment, the recommendation system compares signatures of literary works (such as self-published literary works) to the signatures of literary works that are popular, critically-acclaimed, or otherwise identified as literary works of high quality. Based on how closely a signature of a literary work matches the signatures of these high quality literary works, the recommendation system assigns a quality score to the literary work. The recommendation system may use the quality scores to rank literary works. A selection of literary works that are highly ranked (e.g., selected based on the rank being above a threshold level, such as in the top 10, selected in a way that provides the user with a diverse selection of recommended literary works in a manner such as described above, and/or the like) may be included in the list of recommended literary works. The recommendation system can also use the quality scores to filter literary works that fall below a threshold value. For example, if the quality score of a literary work falls below the threshold value, the recommendation system may identify the literary work as one that should be removed from the network-based system that allows users to read, review, and/or obtain literary works.

The literary work recommendation techniques described herein can be implemented in various environments, such as in any computer-based environment in which literary works can be analyzed across various features and/or dimensions. For example, one possible environment includes a server and several databases that can be accessed by the server. The computing system (e.g., a recommendation system) may retrieve the extracted features of literary works from a literary works database and encode the extracted features in one or more graphs. The computing system may then generate a signature (e.g., a vector) associated with the literary work that is based on the relationships (e.g., between characters and/or geographic locations) depicted in the one or more graphs. The signature, along with an identity of the literary work to which the signature is associated, can be stored in a database, such as a literary works representation database. The computing system can generate and store a signature for any number of literary works (e.g., hundreds of thousands of literary works, millions of literary works, etc.). For example, the computing system can generate and store a signature for each literary work in a digital library (e.g., where a digital library can include millions of literary works). As new literary works are added to the digital library, the computing system may be notified and immediately or nearly immediately commence generating signatures for storage. The computing system may generate the graphs and signatures prior to any request for a literary works ranking or recommendation.

A user, after reading or reviewing a literary work, may provide feedback (e.g., a rating) regarding the literary work, which can be stored in a user database in an entry associated with the user. The ratings assigned to literary works by the user may be used as a measure of a literary work's quality as perceived by the user. The computing system can then compare the signatures of the rated literary works to the signatures of other literary works. If a signature matches or closely matches the signature of a literary work that was highly rated by the user, then the computing system may identify the literary work associated with the matching or closely matching signature as a possible recommendation. The computing system can also score and rank literary works by how closely its respective signature matches the signature of a literary work that was highly rated. For example, literary works that have signatures that more closely match the signature of a literary work that was highly rated can be scored and ranked higher than literary works that have signatures that less closely match the signature of a literary work that was highly rated (e.g., a literary work that has a signature that most closely matches the signature of the literary work that was highly rated can be ranked first, followed by literary works that more closely match the signature of the work that was highly rated in order of how close they match the signature of the work that was highly rated). Likewise, if a signature matches or closely matches the signature of a literary work that received a low rating by the user, then the computing system may filter and not provide as recommendations literary works associated with matching or closely matching signatures.

The computing system can generate recommendations that are personalized to a user (e.g., based on the user-provided ratings). For example, personalized recommendations can be generated for some or all users that access the digital library. The computing system can also generate generic recommendations. For example, the computing system can use aggregated ratings (e.g., determine an average rating based on all ratings received for a single literary work) as a measure of a literary work's quality. The signatures of new or unrated literary works can be compared with the signatures of rated literary works to score and determine a relative quality ranking of the new or unrated literary works and/or to suggest literary works from the pool of new or unrated literary works.

In some embodiments, the computing system can generate a targeted electronic notification related to a literary work that is suggested for a user based on the positive and/or negative models associated with the user. For example, the electronic notification can be an image, a link to purchase or view the literary work, an aural and/or visual description of the literary work, and/or any combination of the examples provided herein. Data that instructs a user computing device to display the targeted electronic notification in, for example, a browser window, can be transmitted to the user computing device.

The recommendation service provided by the computing system may provide several benefits. For example, the computing system can generate the signatures and perform comparisons in real-time (e.g., within a few seconds), thereby allowing the computing system to provide quickly a recommendation to the user that is based on the quality of various literary works. The recommendation can be generated quickly and based on all literary works in a digital library, not just select works that have been read by a friend or acquaintance. As another example, the computing system can identify trends in the literary works that the user likes and/or dislikes that may not be apparent to a human. Unbeknownst to the user, the user may like literary works that have a plot that is cognitively more sophisticated or otherwise hard to understand. Even given a list of literary works that a user likes, a human may not be able to identify the common traits within those literary works that the user finds appealing (or the common traits within those literary works that do not affect whether the user finds a literary work appealing or unappealing). For example, the human may not recognize certain traits within the literary works, may focus on one set of traits while ignoring other, possibly more important traits, and/or the like. By computing the signature of a literary work and comparing it to signatures of other literary works that may be rated by a user or otherwise identified as having a high level of quality (e.g., via the use of one or more machine-learning techniques or algorithms, where, if multiple machine-learning techniques or algorithms are used, the predictions may be aggregated), the computing system can identify specific trends, address scaling issues, remove human bias, and/or identify non-obvious relationships and therefore provide more meaningful recommendations.

By generating signatures for literary works once and reusing the signatures to generate rankings or recommendations (e.g., recommending literary works or identifying literary works to filter) for a plurality of users, the computing system can reduce the processing overhead associated with analyzing the information extracted from the literary works. Generating the signatures once and storing them for later use can also reduce the real-time latency when providing recommendations. Thus, the computing system may improve the user experience by providing faster recommendations.

As used herein, the quality of a literary work may be user-dependent. Quality can be measured based on the complexity of the plot, how well the literary work is written grammatically, whether the plot is logically consistent, and/or the like. For example, if the plot of a literary work is cognitively more sophisticated, complicated, or intricate, the literary work may be considered to be of a high quality. Likewise, if the literary work has few grammatical errors or few logical inconsistencies (e.g., the plot does not identify two different characters as the only daughter of another character), the literary work may be considered to be of a high quality.

While the techniques disclosed herein are described with respect to literary works, this is not meant to be limiting. The techniques described herein can apply to other types of content. For example, the techniques described herein can be applied to audiovisual works (e.g., television shows, movies, etc.), music, newspaper articles, magazine articles, item or product descriptions, and/or the like. For example, item accessories may be compatible with a wide range of items. Information can be extracted from item descriptions for these accessories that identify relationships between the accessory and other items (e.g., which items are compatible with which accessories). This information can be encoded in a graph and used to generate a signature via one or more machine-learning techniques or algorithms (where, if multiple machine-learning techniques are used, the predictions may be aggregated). The signatures of different accessories can be compared to provide recommendations to a user. If a user is viewing a page describing a first accessory for a first item, the computing system may determine other accessories that are also compatible with the first item (e.g., based on the comparison).

System Components

FIG. 1A illustrates various blocks in a literary work recommendation system 104 that can be used to provide users with literary work recommendations. The recommendation system 104 may perform two main operations: generate signatures and provide rankings and/or recommendations.

Generating Signatures

In an embodiment, a literary works database 142 stores information extracted from literary works. For example, such information may include the names of characters, the identities of geographic locations, and/or the relationships between the characters and/or the geographic locations. The literary works database 142 may be located external to the recommendation system 142, such as on a separate system or server.

The recommendation system 104 may include a graph generation module 150 that generates graphs based on the extracted information stored in the literary works database 142 and a graph transformation module 152 that generates representations of the generated graphs. For example, the graph generation module 150 may retrieve the extracted information of a literary work from the literary works database 142 and generate nodes and arcs of the graph. Each node may represent an entity in the literary work (e.g., a character, a meta-entity that includes more than one character (e.g., because the characters travel together), a geographic location, etc.). An arc may connect two nodes together and identify the relationship between the entities represented by each node. The arc may be associated with a weighted value to identify the relationship. For example, an arc may have a positive value if a relationship between the entities of two nodes is positive (e.g., two characters are friends, a character had a good experience in a geographic location, etc.). The arc may have a negative value if a relationship between the entities of two nodes is negative (e.g., two characters are enemies, two characters fought against each other, a character had a bad experience in a geographic location, etc.). The arcs may also have an absolute value that is dependent on the strength of the relationship between the two entities. For example, the absolute value may be high if two characters are often together, if two characters are married, if two characters fight often, if a character lives in a geographic location, and/or the like. Likewise, the absolute value may be low if two characters are merely acquaintances, a character visited a geographic location once, and/or the like. The nodes and arcs of a graph are described in greater detail below with respect to FIGS. 3A-3B.

The graph transformation module 152 may use the generated graph to generate a signature for the literary work, which may be in the form of a vector or other such representation. The vector may have various fields or elements that correspond to various aspects of the graph. For example, the graph may be parsed into various sub-graphs, where each sub-graph represents an aspect of the plot (e.g., 5 characters are friends, one character fights another character, 3 characters live in a specific geographic location, etc.). A sub-graph may be extracted from the graph using a variety of techniques, such as by creating (or identifying) a directed acyclic graph (DAG) using one or more nodes in the graph, creating (or identifying) a clique (e.g., an undirected graph) using one or more nodes in the graph, creating (or identifying) a maximum clique using one or more nodes in the graph, selecting a random subset of nodes in the graph, and/or the like. For example, a DAG may be created by selecting a node in the graph and orienting the edges of the node to create one or more paths. A path can be selected (e.g., the graph can be traversed from the selected node to another node referenced by an oriented edge), and the edges at the corresponding node can be oriented and another path can be selected in a similar manner. This process may continue until there is a risk that a path may lead back to the initially selected node in the graph, at which point no more paths are selected and the DAG is complete. A new DAG can then be created by selecting a node in the graph that has not already been included in a previously generated DAG, and DAGs can be created until all nodes in a graph have been included in a DAG. There may be overlap between the different sub-graphs and each sub-graph may correspond to a field or element in the vector. Vectors for some or all literary works may have common fields or elements such that comparisons are possible. The graph transformation module 152 may store the generated signature and/or an identity of the literary work associated with the generated signature in a literary works representation database 146.

In an embodiment, the graph generation module 150 and/or the graph transformation module 152 uses the signatures generated for one or more literary works that are popular, critically-acclaimed, or otherwise identified as literary works of high quality to create a vocabulary. For example, the vocabulary may be in the form of a signature (e.g., a signature derived from the combination of multiple signatures, where values for the same sub-graph may be averaged or combined in a similar manner) and include the values associated with some or all sub-graphs extracted from the graphs of these literary works. The graph transformation module 152 may then use this vocabulary to attempt to represent new literary works (e.g., self-published literary works or other literary works that are not famous) with signatures that are structured similar to the vocabulary. For example, a portion of the plot of a new literary work may be unique or esoteric such that the same type of plot is not found in the popular, critically-acclaimed, and/or high quality literary works. Generally, the graph of the new literary work may include a sub-graph related to this portion of the plot. However, instead of including values for sub-graphs related to this portion of the plot in the signature for the new literary work, the graph transformation module 152 may only include in the signature values for sub-graphs that are also found in the vocabulary (e.g., that are also found in the graphs of the popular, critically-acclaimed, and/or high quality literary works). The degree by which the signature of a new literary work matches the vocabulary (e.g., the degree by which the values in the signature of the new literary work match the values in the vocabulary) may be used to score and rank new literary works (and ultimately provide recommendations as described below).

As extracted information for new literary works is added to the literary works database 142, the graph generation module 150 may be notified. The graph generation module 150 may then generate a graph for the new literary work, the graph transformation module 152 may generate a signature for the new literary work using the generated graph, and the graph transformation module 152 may store the signature in the literary works representation database 146.

Providing Rankings and/or Recommendations

In an embodiment, a user database 144 stores feedback provided by users for various literary works. For example, the user database 144 stores an entry for each user, where the entry includes ratings assigned to literary works by the respective user. As users rate additional literary works, the user database 144 may be updated. The user database 144 may be located external to the recommendation system 142 and/or the literary works database 142, such as on a separate system or server.

In an embodiment, the recommendation system 104 further comprises a recommendation module 154 that can rank literary works and/or generate one or more literary works recommendations for a user. For example, when the user visits a page that provides unsolicited quality rankings of literary works, when the user visits a page that provides unsolicited literary works recommendations, or when the user explicitly requests a ranking or recommendation, the recommendation module 154 may be so notified. The recommendation module 154 can retrieve some or all of the signatures stored in the literary works representation database 146 and/or user feedback data from the user database 144 to provide the rankings or recommendations.

To provide a personalized ranking to a user, the recommendation module 154 may use the user feedback data to identify literary works that were assigned a high rating by the user (e.g., 4 out of 5 stars, 5 out of 5 stars, etc.). The recommendation module 154 may use the signature of one literary work assigned a high rating or the signatures of several literary works assigned a high rating (e.g., by aggregating the signatures, such as by taking an average of each value in each field in the vector) as a baseline by which to rank other literary works (e.g., new literary works, literary works not read by the user, etc.). For example, the signature of a new literary work may be compared with the signature of a literary work assigned a high rating. If the signatures match or closely match (e.g., the vectors have similar values for one or more common fields), then the recommendation module 154 may assign the new literary work a high score (leading to a high ranking). Likewise, if the signature of the new literary work does not match the signature of the literary work assigned a high rating within a set of threshold values (e.g., the vectors do not have similar values for a threshold number of common fields, the values for a chosen field are not within a threshold value, etc.) or matches or closely matches the signature of a literary work assigned a low rating, then the recommendation module 154 may assign the new literary work a low score (leading to a low ranking). Literary works assigned a low score may be filtered or otherwise prevented from being included in rankings and/or recommendations to the user. Alternatively, literary works assigned a low score may be included in rankings and/or recommendations (e.g., included in the rankings and/or recommendations transmitted to the user device 102), but the display or presentation of such literary works by the user device 102 may be hidden (e.g., to have literary works displayed, the user device 102 may need the proper cryptographic key or function, and thus the proper cryptographic key or function may be provided for literary works with high scores and may not be provided for literary works with low scores). The recommendation module 154 may perform the comparison using machine-learning techniques or algorithms, such as linear regressions, logistic regressions, neural networks, and/or the like, and/or any combination thereof (where, if multiple machine-learning techniques are used, the predictions may be aggregated). The recommendation module 154 may repeat this process for one or more literary works not otherwise rated by the user to generate a ranking of literary works.

The recommendation module 154 may further pare or filter the ranking of literary works such that only a select number of literary works are included in the ranking. For example, the ranking may only include the top-ranked literary works (e.g., the top 10 literary works, the top 20 literary works, etc.). As another example, a utility function that maximizes the types of literary works included in the ranking can be used for diversification purposes. If two literary works that closely match the signature of the literary work assigned a high rating are written by the same author or are part of the same series (e.g., a trilogy, a volume, etc.), one of the literary works may be removed from the ranking such that the user receives a diverse selection of recommended literary works. The recommendation module 154 may generate personalized rankings for any number of users and provide the rankings to the appropriate user device 102.

The recommendation module 154 may use a similar process to provide personalized recommendations to a user. For example, the recommendation module 154 may generate a ranking of literary works based on a baseline literary work chosen by the user (e.g., a literary work that the user just read) or selected for the user (e.g., a literary work selected based on the user's reading history) in a manner as described above. The recommendation module 154 may recommend one or more literary works that are included in the ranking (e.g., the first-ranked literary work, the top three-ranked literary works, etc.) and provide such recommendation to the user device 102.

The recommendation module 154 may also re-rank or filter a set of existing recommendations provided to a user. For example, a collaborative or other conventional recommendation engine may rank and/or recommend literary works to a user. The rankings techniques described above can be used to rescore literary works present in the existing recommendations. Based on the new scores, the recommendation module 154 may then reorder the existing rankings and/or select a different literary work to recommend to the user.

To provide a generic ranking, the recommendation module 154 may use other data to identify a baseline literary work. For example, the recommendation module 154 may use a literary work that is popular (e.g., based on number of users that have read the literary work, based on sales, etc.), critically-acclaimed, or otherwise identified as a literary work of high quality as the baseline literary work. Such information may be retrieved from a database internal or external to the recommendation system 104 (not shown). The recommendation module 154 may then score and rank literary works in a manner as described above. Alternatively, the recommendation module 154 may retrieve a vocabulary (which can be stored in the literary works representation database 146) generated in a manner as described above and compare the vocabulary with the signatures of one or more literary works. The recommendation module 154 may then score and rank the literary works based on the degree by which the signatures match the vocabulary. Generic recommendations can be provided by sending to the user device 102 an identity of one or more literary works that are included in the ranking (e.g., the first-ranked literary work, the top three-ranked literary works, etc.).

The recommendation module 154 may provide the ranking and/or recommendation to the user device 102 via a page generation server that incorporates the rankings and/or recommendations into a page. The page generation server may then transmit the page to the user device, where the page is in the form of data that causes the user device 102 to display information about the ranking and/or recommendation. For example, the code of the transmitted page, when executed by a browser application running on the user device 102, causes the user device 102 to display an identity of the literary works that are ranked (and their relative ranking) and/or recommended in a user interface.

The rankings and/or recommendations may be incorporated into a detail page of a literary work along with an explanation of why the literary works are ranked in a certain order and/or why the literary works are being recommended. For example, the detail page may be for a first literary work and provide a description of the first literary work. A portion of the detail page may include a widget, text box, window, and/or the like that provides a list of one or more literary works that are similar to the first literary work and an explanation of why the literary works are considered similar to the first literary work. The explanation may include language indicating that the similar literary works have a similar structure, similar plot, etc. as the first literary work. The recommendation module 154 may periodically identify literary works that are similar to the first literary work (e.g., every week, every month, when new literary works are included in the literary works database 142, etc.) and provide an updated ranking and/or recommendation list to the page generation server such that the detail page can be updated.

In alternate embodiments, the recommendation module 154 may not transmit rankings or recommendations directly to the user device 102 or indirectly via a page generation server. Rather, the recommendation module 154 may generate an electronic message, such as an email, text message, instant message, or the like, that includes the rankings and/or recommendations, and the electronic message may be transmitted to an account associated with the user of the user device 102.

In an embodiment, the recommendation includes an identity of the literary work and/or a link (e.g., to the corresponding literary work detail page) or option to review, purchase, or otherwise learn more information about the literary work. In other embodiments, the recommendation is in the form of an electronic notification. For example, the electronic notification can be an image, a link to purchase or view the literary work, an aural and/or visual description of the literary work, and/or any combination of the examples provided herein.

In a further embodiment, the rankings and/or recommendations generated by the recommendation module 154 can be used to classify literary works that are new, that have not been rated, and/or that have only a few ratings. For example, if a literary work is highly ranked (either in the generic ranking or the personalized ranking), then the recommendation module 154 may classify the literary work as a literary work of high quality. Likewise, if a literary work is assigned a low rank, then the recommendation module 154 may classify the literary work as a literary work of low quality. The network-based system that allows users to read, review, and/or obtain literary works may use the classification to determine a pricing scheme for literary works. For example, the network-based system may select a higher sale price for literary works that are classified as literary works of high quality and may select a lower sale price for literary works that are classified as literary works of low quality.

System Components in an Example Environment

Figure 1B:
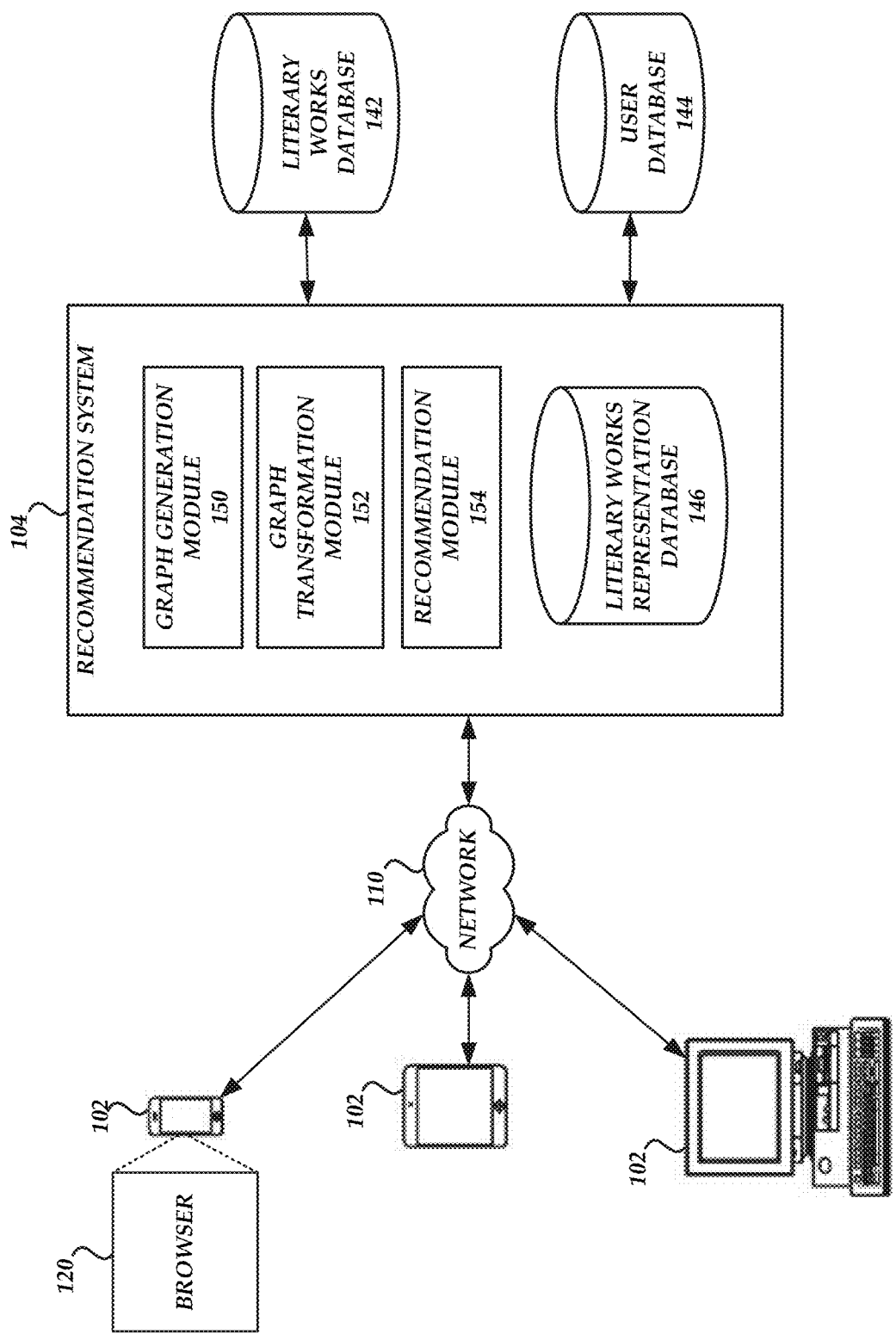
FIG. 1B illustrates an exemplary literary work recommendation environment with the recommendation system of FIG. 1A according to one embodiment.

FIG. 1B illustrates an exemplary literary work recommendation environment with the recommendation system 104 of FIG. 1A according to one embodiment. The environment shown in FIG. 1B may be one of many possible environments in which the recommendation system 104 can be implemented. As illustrated in FIG. 1B, the environment includes various user devices 102 and the recommendation system 104. The recommendation system 104 may include multiple distinct computers or machines, some of which may be assigned to different recommendation tasks than others. The system components may communicate with each other via one or more communication networks 110. The network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

The environment may include any number of distinct user devices 102. In addition, multiple (e.g., two or more) recommendation systems 104 may be used. For example, separate recommendation systems 104 may be located so that they are close (in either a geographical or networking sense) to groups of current or potential user devices 102. In such a configuration, a user device 102 may receive an indication of one or more literary works that a user associated with the user device 102 may enjoy or be interested in via the recommendation system 104 to which it is closest, rather than all user devices 102 receiving rankings and/or recommendations via a single recommendation system 104.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 102 may execute a browser application to communicate via the network 110 with other computing systems, such as the recommendation system 104, in order to request and/or receive recommendations. The user devices 102 may execute a browser application 120 that can be used by a user to access a page that provides literary works rankings and/or recommendations.

The recommendation system 104 can be a computing system configured to generate graphs associated with literary works based on information extracted from the literary works, generate signatures for each of the literary works based on the generated graphs, and provide rankings and/or recommendations of literary works that individual users may be interested in using machine-learning techniques. For example, the recommendation system 104 can be a physical server or group of physical servers that may be accessed via the network 110.

As described above with respect to FIG. 1A, the recommendation system 104 may include various modules, components, data stores, and the like to provide the ranking and recommendation functionality described herein. For example, the recommendation system 104 may include the graph generation module 150, the graph transformation module 152, the recommendation module 154, and the literary works representation database 146. In some embodiments, the recommendation system 104 may include additional or fewer modules than those shown in FIG. 1B. The recommendation system 104 may be part of a larger electronic catalog system or site that provides functionality for users to, e.g., interactively browse, search for, review, rate, tag, purchase, sell and obtain recommendations of catalog items such as book titles; examples of such systems are described, e.g., in U.S. Pat. Nos. 7,685,074, 7,472,077 and 8,122,020, the disclosures of which are hereby incorporated by reference.

The graph generation module 150, the graph transformation module 152, and/or the recommendation module 154 can operate in parallel and for multiple users at the same time. For example, rankings and/or recommendations for unique user devices 102 may be requested and the components of the recommendation system 104 can generate the recommendations simultaneously or nearly simultaneously for the unique user devices 102 in real-time (e.g., the recommendation system 104 can generate a recommendation for a first user at the same time or at nearly the same time (e.g., within a couple seconds) as a recommendation is generated for a second user; the recommendation system 104 can generate the recommendations simultaneously or nearly simultaneously as instantaneously as possible, limited by processing resources, available memory, network bandwidth conditions, and/or the like; the recommendation system 104 can generate the recommendations simultaneously or nearly simultaneously based on a time it takes the hardware components of the recommendation system 104 to process data; the recommendation system 104 can generate the recommendations simultaneously or nearly simultaneously immediately as data is received (instead of storing, buffering, caching, or persisting data as it is received and processing the data later on; the recommendation system 104 can generate the recommendations simultaneously or nearly simultaneously in real-time by transforming data without intentional delay, given the processing limitations of the recommendation system 104 and other systems, like the user devices 102, and the time required to accurately receive and/or transmit the data; the recommendation system 104 can generate the recommendations simultaneously or nearly simultaneously in real-time by processing or transforming data fast enough to keep up with an input data stream; etc.) or near real-time (e.g., substantially immediately, where substantially generally means within a couple seconds of immediate real-time operation and can be measured by determining whether the recommendation system 104 can determine that a ranking and/or recommendation should be provided to a first user and generate a ranking and/or recommendation for the first user within the same browsing session of the first user).

As described above, in some embodiments, the literary works database 142 is located external to the recommendation system 104. For example, the literary works database 142 may be stored and managed by a separate system or server (e.g., a server that extracts information from literary works) and may be in communication with the recommendation system 104 via a direct connection or an indirect connection (e.g., via a network, such as the network 110). In other embodiments, not shown, the literary works database 142 is located within the recommendation system 104.

The user database 144 may also be located external to the recommendation system 104. For example, the user database 144 may be stored and managed by a separate system or server (e.g., a literary works rating server) and may be in communication with the recommendation system 104 via a direct connection or an indirect connection (e.g., via a network, such as the network 110). In other embodiments, not shown, the user database 144 is located within the recommendation system 104.

Example Process for Recommending a Literary Work

Figure 2:
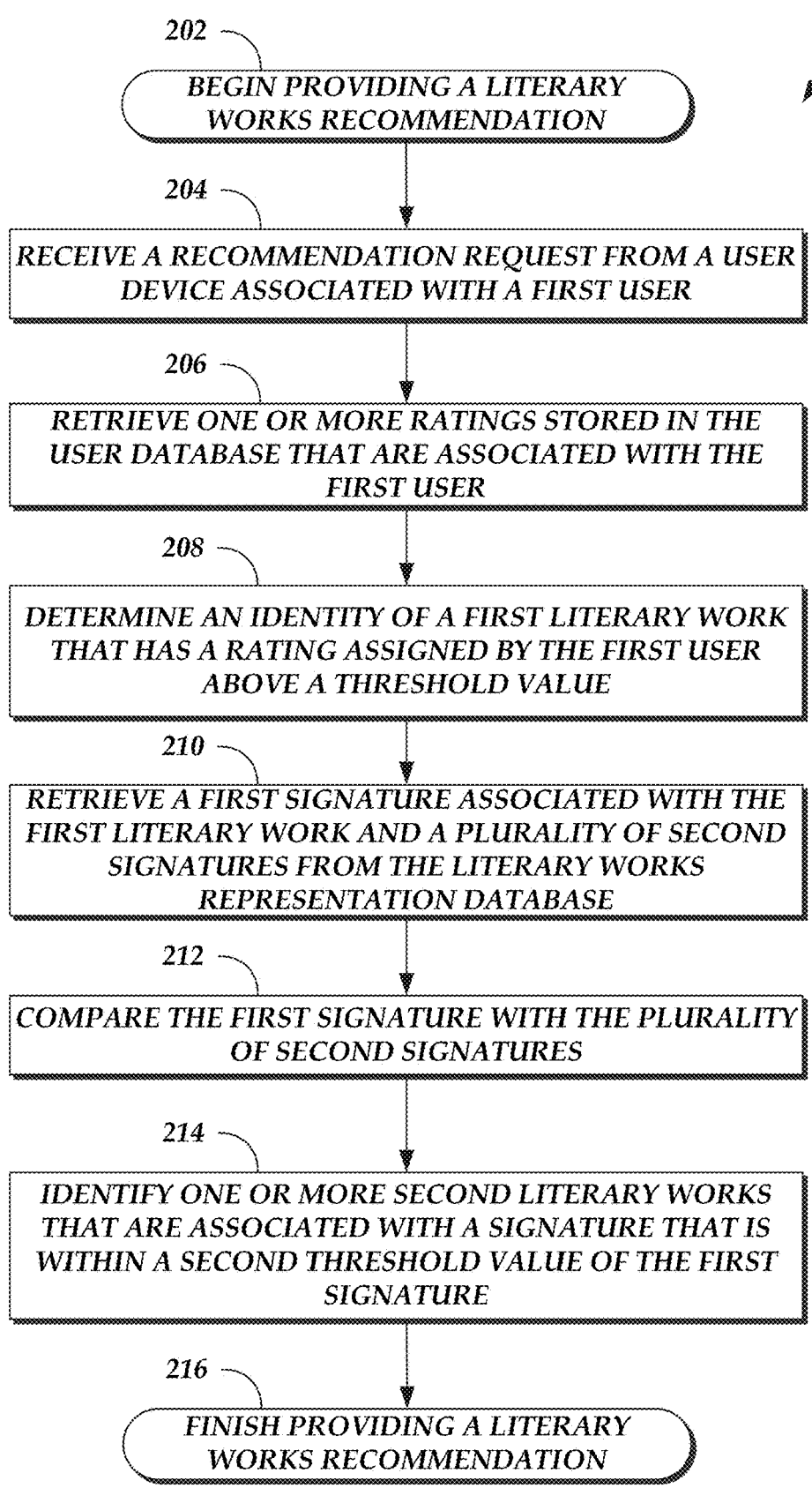
FIG. 2 illustrates a process that may be used to provide a literary works recommendation to a user.

FIG. 2 illustrates a process 200 that may be used by the recommendation system 104 to provide a literary works recommendation to a user. As an example, the recommendation system 104 of FIG. 1 can be configured to implement the literary works recommendation process 200. The literary works recommendation process 200 begins at block 202.

At block 204, a recommendation request is received from a user device associated with a first user. The recommendation request may include an explicit or implicit request for recommendations of literary works (e.g., the user device may explicitly request the recommendation or the user may merely access or visit a network page that provides recommendations). For example, the user device may request a page that is configured to display personalized book recommendations.

At block 206, one or more ratings stored in a user database that are associated with the first user are retrieved. For example, the ratings may be a numerical value (e.g., on a scale of 1 to 10), a number of stars (e.g., on a scale of 1 to 5 stars), and/or the like.

At block 208, an identity of a first literary work that has a rating assigned by the first user above a threshold value is determined. The threshold value may be a numerical value, such as 7 if literary works are rated on a scale of 1 to 10, or a number of stars, such as 4 if literary works are rated on a scale of 1 to 5 stars.

At block 210, a first signature associated with the first literary work and a plurality of second signatures are retrieved from the literary works representation database. The plurality of second signatures may be associated with a subset of literary works in a digital library. A signature may be generated based on a parsing of a graph associated with a literary work. The graph may include nodes and arcs that correspond to entities in the literary work (e.g., characters, geographic locations, etc.) and their respective relationships, and the graph may be generated based on information extracted from the text of the literary work.

At block 212, the first signature is compared with the plurality of second signatures. For example, the first signature and the plurality of second signatures may be compared by comparing the values in the individual fields of the vectors that make up the signatures. The comparison may be performed using machine-learning techniques.

At block 214, one or more second literary works that are associated with a signature that is within a second threshold value of the first signature is identified. In an embodiment, a signature is within a second threshold value of the first signature if some or all of the values in the individual fields of the vector that makes up the signature is within a threshold value of the corresponding field of the vector that makes up the first signature. The identity of the one or more literary works may be provided to the user in the form of a suggestion or electronic notification. After the identity of one or more literary works is identified, the literary works recommendation process 200 may be complete, as shown in block 216. The results (recommendations) may be output for display to the user, or may be combined with the results of other ranking or recommendation processes (such as those described in the above-referenced patents) for purposes of selecting literary works to recommend.

Example Literary Works Graphs

Figure 3A:
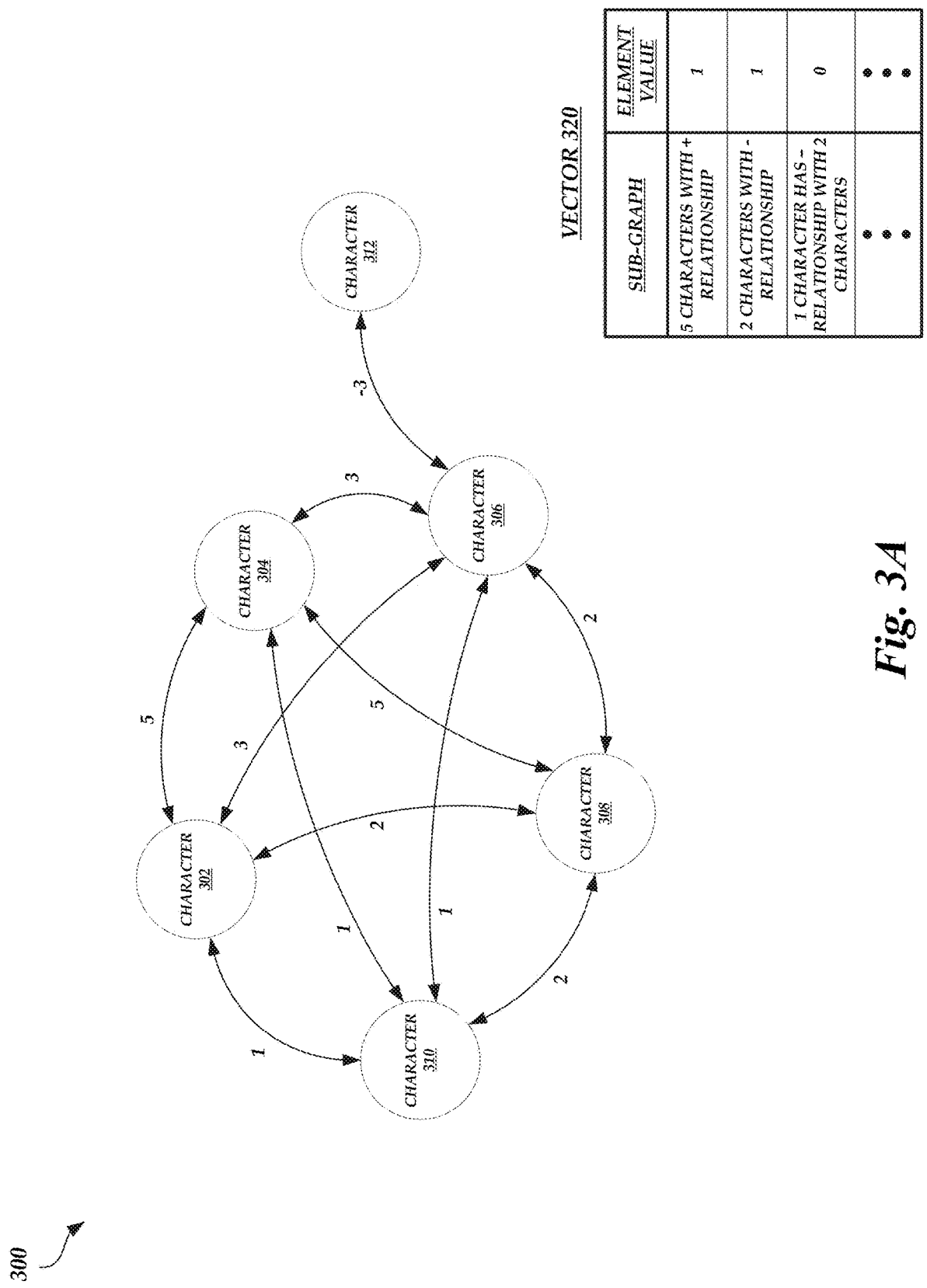
FIGS. 3A-B illustrate example literary works graphs generated based on extracted information.
Figure 3B:
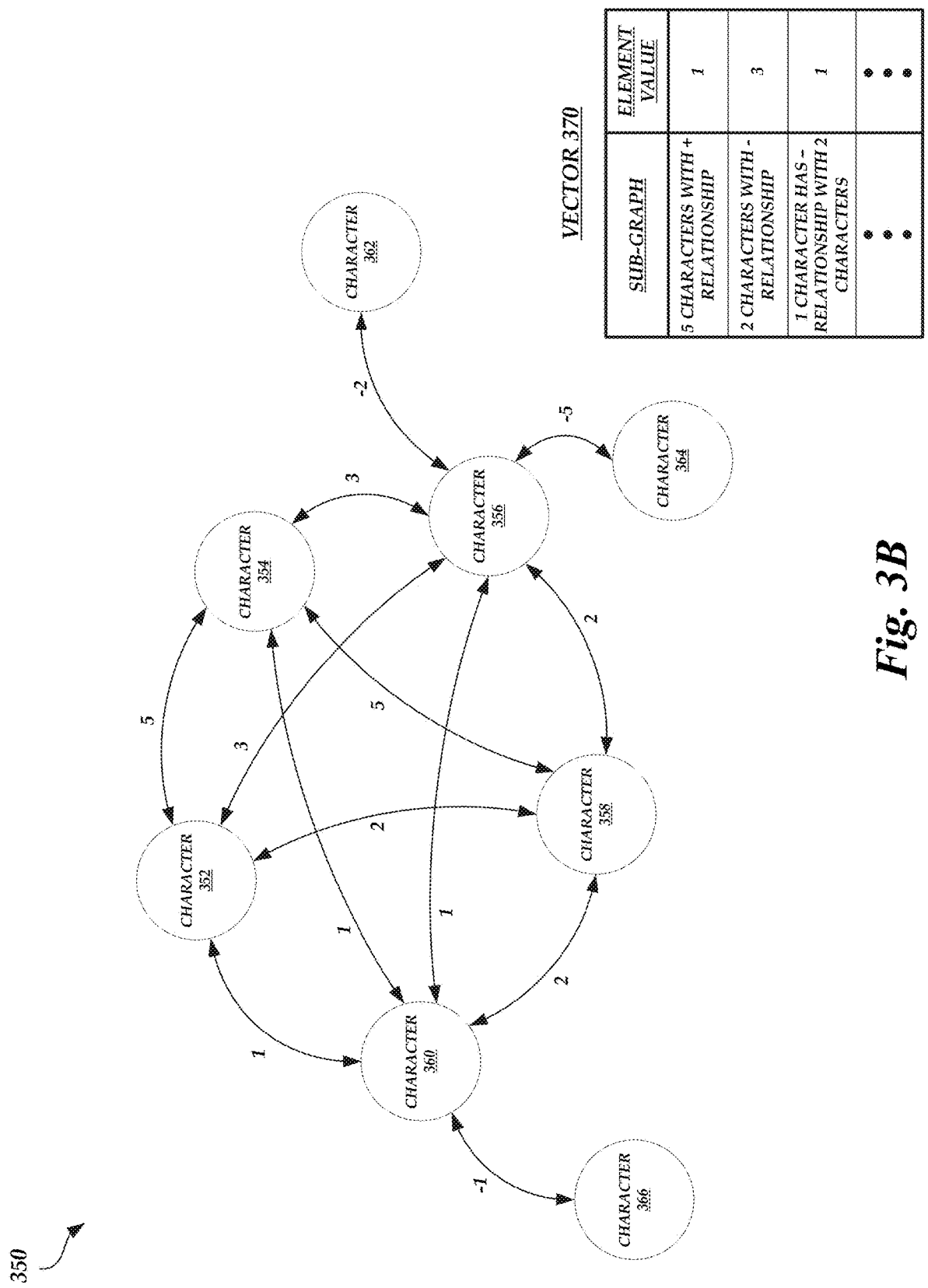

FIGS. 3A-B illustrate example literary works graphs 300 and 350 generated based on extracted information. As illustrated in FIG. 3A, the graph 300 depicts the relationships of characters in a first literary work. The graph 300 includes six nodes 302, 304, 306, 308, 310, and 312 and arcs that connect the various nodes. For illustrative purposes, each node represents a different character in a literary work. However, this is not meant to be limiting as the nodes may also represent other entities in a literary work, such as geographic locations.

Each of the arcs is assigned a value with a positive or negative weight. For example, the arc that connects node 302 with node 310 is assigned a value of 1 with a positive weight. This may indicate that the character represented by node 302 has a positive relationship with the character represented by node 310; however, the strength of the relationship is low (e.g., the characters are merely acquaintances). The arc that connects node 306 with node 312 is assigned a value of 3 with a negative weight. This may indicate that the character represented by node 306 has a negative relationship with the character represented by node 312 and the strength of the relationship is moderate.

Overall, the graph 300 includes five characters that each have a positive relationship with each other and two characters that have a negative relationship with each other. Thus, the graph 300 can be separated into at least two sub-graphs. The first sub-graph may include the five characters that each have a positive relationship with each other. The second sub-graph may include the two characters that have a negative relationship with each other. Thus, there may be overlap between the first sub-graph and the second sub-graph.

Values may be assigned to each sub-graph and stored in a vector, such as vector 320, which is associated with the first literary work. For example, the assigned value may indicate a number of times a particular sub-graph appears in the graph 300. Each element in the vector 320 may correspond with a particular sub-graph. Thus, if a first element in the vector 320 identifies a number of times the graph 300 includes a sub-graph that includes five characters that each have a positive relationship with each other, then the value 1 may be stored in the first element of the vector 320 (because this particular sub-graph occurs once in the graph 300). If a second element in the vector 320 identifies a number of times the graph 300 includes a sub-graph that includes two characters that have a negative relationship with each other, then the value 1 may be stored in the second element of the vector 320 (because this particular sub-graph occurs once in the graph 300). If a third element in the vector 320 identifies a number of times one character has a negative relationship with two other characters, then the value 0 may be stored in the third element of the vector 320 (because this particular sub-graph is not present in the graph 300). Thus, values may be stored in the vector 320 and the vector 320 may serve as the signature associated with the first literary work.

As illustrated in FIG. 3B, the graph 350 depicts the relationships of characters in a second literary work. The graph 350 includes eight nodes 352, 354, 356, 358, 360, 362, 364, and 366 and arcs that connect the various nodes. For illustrative purposes, each node represents a different character in a literary work. However, this is not meant to be limiting as the nodes may also represent other entities in a literary work, such as geographic locations.

As described above, the vectors may share common elements to enable comparisons. Thus, vector 370, which is associated with the second literary work, may include the same first three elements as the vector 320. Graph 350 also includes a sub-graph that includes five characters that each have a positive relationship with each other. Thus, a value of 1 may be stored in the first element of the vector 370. However, unlike the graph 300, the graph 350 includes three sub-graphs that include two characters that have a negative relationship with each other. Thus, a value of 3 may be stored in the second element of the vector 370. Likewise, unlike the graph 300, the graph 350 includes one sub-graph that includes one character that has a negative relationship with two other characters. Thus, a value of 1 may be stored in the third element of the vector 370.

Vectors 320 and 370 can be compared (e.g., by the recommendation system 104) to identify the relative quality of each literary work and/or to determine whether either literary would should be presented as a recommendation to a user. For example, if a user highly rated the first literary work, the vector 320 and the vector 370 can be compared to determine whether the second literary work should be recommended to the user. In some embodiments, because the vector 320 and the vector 370 each have the same value in the first element, the second literary work may be recommended to the user. However, in other embodiments, because the vector 320 and the vector 370 have different values in the second element and the third element (and the values possibly have a difference greater than a threshold value), the second literary work may not be recommended to the user.

A graph may be separated into any number of types of sub-graphs. For illustrative purposes and simplicity, FIGS. 3A-3B identify three types of sub-graphs. However, this is not meant to be limiting. The graph 300, for example, may include other sub-graphs. For example, the graph 300 also includes five sub-graphs that include four characters that each have a positive relationship with a fifth character.

Example Network Page Viewed on a User Device

Figure 4:
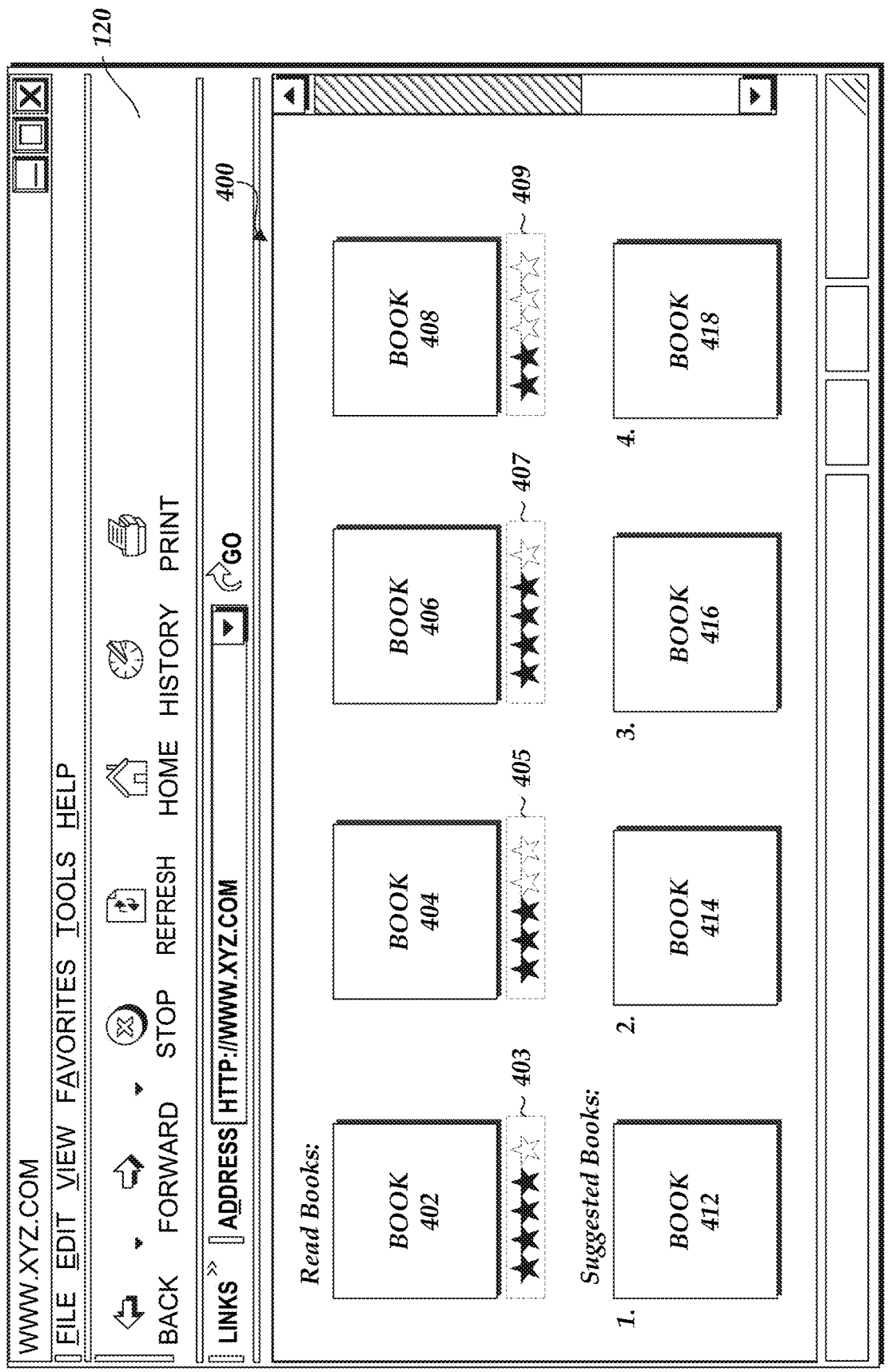
FIG. 4 illustrates an example of a representation of a network page displayed on a user device, such as the user device.

FIG. 4 illustrates an example of a representation of a network page 400 displayed on a user device, such as the user device 102. The network page 400 may be displayed within the user interface of the browser application 120 of the user device 102. As illustrated in FIG. 4, the network page 400 includes content, such as list of books 402, 404, 406, and 408 read by a user, ratings 403, 405, 407, and 409 for each read book, and a suggested, ranked list of books to read (e.g., books 412, 414, 416, and 418).

As described herein, the user device 102 may open the network page 400. In response to opening the network page 400, the recommendation system 104 may access the signatures stored in the literary works representation database 146 and/or the ratings stored in the user database 144 that are associated with the user of the user device 102. The accessed ratings may be the ratings 403, 405, 407, and 409 assigned by the user to books 402, 404, 406, and 408, respectively. The recommendation system 104 may compare the signatures of one or more of books 402, 404, 406, and/or 408 with the signatures of other literary works stored in the literary works representation database 146, such as the signatures of books 412, 414, 416, and 418.

As illustrated in FIG. 4, the recommendation system 104 may determine that the books 412, 414, 416, and 418 have signatures that match or closely match the signature(s) of books 402, 404, 406, and/or 408 and may transmit an identity of the books 412, 414, 416, and 418 to the user device 102 for display by the browser application 120 in the network page 400. The recommendation system 104 may also rank the books 412, 414, 416, and 418 in order of how closely their signatures match the signature(s) of books 402, 404, 406, and/or 408 and may transmit an indication of the ranking to the user device 102 for display by the browser application 120 in the network page 400. In some embodiments, each recommended book may be presented together with an auto-generated explanation of why the book is being recommended. An example of such an explanation is: "recommended because this book has a plot complexity that is similar to <book title 1>, which you rated highly." Another example of such an explanation is: "recommended because this book has a same or nearly same level of quality as <book title 1>, which you rated highly."

In further embodiments, the results of the recommendation system 104 can be incorporated into a book's detail page or item description page. For example, the recommendation system 104 may determine that a first book is similar to a second book based on the ranking and recommendation techniques described herein. During the process of comparing signatures, the recommendation system 104 may also identify the reasons why the first book and the second book are similar. Thus, the detail or item description page of the first book can be updated to include a message explaining that the first book is similar to the second book and why. Similarly, the detail or item description page of the second book can be updated to include a message explaining that the second book is similar to the first book and why. An example of such a message is: "the following books have similar plots and writing styles as <book title 1>: <book title 2> and <book title 3>."

Additional Embodiments

The recommendation system 104 of FIGS. 1A-B may be a single computing device, or it may include multiple distinct computing devices, such as computer servers, logically or physically grouped together to collectively operate as a server system. The components of the recommendation system 104 can each be implemented in application-specific hardware (e.g., a server computing device with one or more ASICs) such that no software is necessary, or as a combination of hardware and software. In addition, the modules and components of the recommendation system 104 can be combined on one server computing device or separated individually or into groups on several server computing devices. In some embodiments, the recommendation system 104 may include additional or fewer components than illustrated in FIGS. 1A-B.

In some embodiments, the features and services provided by the recommendation system 104 (e.g., a literary works ranking and/or recommendation service) may be implemented as web services consumable via the communication network 110. In further embodiments, the recommendation system 104 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on general purpose computer hardware, or combinations of both. To clearly illustrate this interchangeability of hardware and software, various illustrative components, blocks, modules, and steps have been described above generally in terms of their functionality. Whether such functionality is implemented as specialized hardware versus software running on general-purpose hardware depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer process, comprising:
generating, in computer storage, a graph data structure that represents relationships between entities described in a literary work, the entities including persons represented in the literary work, the graph data structure including data values representing types of said relationships, wherein generating the graph data structure comprises extracting information about the entities and relationships from text of the literary work by applying natural language processing to said text;
generating the signature of the literary work, wherein generating the signature comprises identifying a plurality of sub-graphs of the graph data structure, and for individual types of the sub-graphs, determining how many times the respective type of sub-graph occurs in the graph data structure; and
subsequently, responding in real time to an action performed by a user during a browsing session by at least:
comparing the signature to a signature of a second literary work rated favorably by the user, and
determining, based at least partly on an outcome of the comparison, whether to recommend the literary work to the user;
wherein responding to said action in real time comprises comparing the signature of the second literary work in real time to pre-generated signatures of a plurality of respective literary works.

2. The method of claim 1, wherein the signature comprises a plurality of elements, including an element corresponding to a respective subgraph type and comprising a data value representing a number of times the subgraph type occurs in the graph data structure.

3. The method of claim 2, wherein the signature is a vector.

4. The method of claim 2, wherein said comparing comprises identifying subgraph types that appear in both of said signatures.

5. The method of claim 4, wherein comparing said signatures further comprises, for a first subgraph type that appears in both signatures, determining whether both signatures include a common data value representing an occurrence count of the first subgraph type.

6. The method of claim 1, wherein the signatures are compared using a machine learning algorithm.

7. The method of claim 1, wherein a first type of subgraph of the plurality of subgraph types corresponds to a first type of relationship between two or more of the entities, and a second type of subgraph of the plurality of subgraph types corresponds to a second type of relationship between two or more of the entities.

8. The method of claim 7, wherein the first type of relationship is a positive relationship, and the second type of relationship is a negative relationship.

9. The method of claim 1, wherein the entities additionally include geographic locations.

10. A computer system comprising one or more computing devices, the computer system programmed to implement at least:
a graph generator that generates a graph representing relationships between entities described in a literary work, the entities including persons represented in the literary work, the graph including data values representing types of said relationships, wherein the graph generator generates the graph by a process that comprises extracting information about the entities and relationships from text of the literary work by applying natural language processing to said text;
a signature generator that generates a signature of the literary work by a process that comprises identifying a plurality of sub-graphs of the graph, and for individual types of the sub-graphs, determining how many times the respective type of sub-graph occurs in the graph; and
a literary work recommender that determines whether to recommend the literary work to a user who has favorably rated a second literary work at least partly by comparing respective signatures of the literary work and second literary work, wherein the literary work recommender performs said comparison and makes said determination in real time in response to a user action performed during a browsing session of the user, said user action performed subsequent to the generation of said signatures, wherein the literary work recommender, in responding to the user action, compares the signature of the second literary work in real time to pre-generated signatures of a plurality of respective literary works.

11. The computer system of claim 10, wherein the signature comprises a plurality of elements, including an element that corresponds to a respective subgraph type and comprises a data value representing a number of times the subgraph type occurs in the graph.

12. The computer system of claim 11, wherein the signature is a vector.

13. The computer system of claim 10, wherein the literary work recommender compares said signatures by a process that comprises, for a first subgraph type that appears in both signatures, determining whether both signatures include a common data value.

14. The computer system of claim 10, wherein a first type of subgraph of the plurality of subgraph types corresponds to a first type of relationship between two or more of the entities, and a second type of subgraph of the plurality of subgraph types corresponds to a second type of relationship between two or more of the entities.

15. The computer system of claim 14, wherein the first type of relationship is a positive relationship, and the second type of relationship is a negative relationship.

16. The computer system of claim 10, wherein the entities additionally include geographic locations.

17. Non-transitory computer storage that stores executable program instructions comprising:
    a graph generator module that, when executed, generates a graph representing relationships between entities described in a literary work, the entities including persons represented in the literary work, the graph including data values representing types of said relationships, wherein the graph generator module generates the graph data structure by a process that comprises extracting information about the entities and relationships from text of the literary work;
    a graph transformation module that, when executed, generates a signature of the literary work by a process that comprises identifying a plurality of sub-graphs of the graph, and for individual types of the sub-graphs, determining how many times the respective type of sub-graph occurs in the graph; and
    a recommendation module that, when executed, determines, in real time, in response to a user action performed during a browsing session of a user who has favorably rated a second literary work, whether to recommend the literary work to the user at least partly by comparing respective signatures of the literary work and second literary work, wherein the recommendation module is configured to re-use the signatures of the literary work and second literary work to generate literary work recommendations for additional users.

18. The non-transitory computer storage of claim 17, wherein the signature comprises a plurality of elements, and including an element that corresponds to a respective sub-graph type and comprises a data value representing a number of times the subgraph type occurs in the graph.

19. The method of claim 1, wherein responding to said action in real time further comprises generating a personalized page that recommends the literary work to the user.

20. A computer process, comprising:
    generating, in computer storage, a graph data structure that represents relationships between entities described in a literary work, the entities including persons represented in the literary work, the graph data structure including data values representing types of said relationships, wherein generating the graph data structure comprises extracting information about the entities and relationships from text of the literary work by applying natural language processing to said text;
    generating the signature of the literary work, wherein generating the signature comprises identifying a plurality of sub-graphs of the graph data structure, and for individual types of the sub-graphs, determining how many times the respective type of sub-graph occurs in the graph data structure;
    subsequently, responding in real time to an action performed by a user during a browsing session by at least:
        comparing the signature to a signature of a second literary work rated favorably by the user, and
        determining, based at least partly on an outcome of the comparison, whether to recommend the literary work to the user; and
        re-using the signatures of the literary work and second literary work to generate literary work recommendations for additional users.

21. A computer system comprising one or more computing devices, the computer system programmed to implement at least:
    a graph generator that generates a graph representing relationships between entities described in a literary work, the entities including persons represented in the literary work, the graph including data values representing types of said relationships, wherein the graph generator generates the graph by a process that comprises extracting information about the entities and relationships from text of the literary work by applying natural language processing to said text;
    a signature generator that generates a signature of the literary work by a process that comprises identifying a plurality of sub-graphs of the graph, and for individual types of the sub-graphs, determining how many times the respective type of sub-graph occurs in the graph; and
    a literary work recommender that determines whether to recommend the literary work to a user who has favorably rated a second literary work at least partly by comparing respective signatures of the literary work and second literary work, wherein the literary work recommender performs said comparison and makes said determination in real time in response to a user action performed during a browsing session of the user, said user action performed subsequent to the generation of said signatures, wherein the literary work recommender is configured to re-use the signatures of the literary work and second literary work to generate literary work recommendations for additional users.

22. Non-transitory computer storage that stores executable program instructions comprising:
    a graph generator module that, when executed, generates a graph representing relationships between entities described in a literary work, the entities including persons represented in the literary work, the graph including data values representing types of said relationships, wherein the graph generator module generates the graph data structure by a process that comprises extracting information about the entities and relationships from text of the literary work;
    a graph transformation module that, when executed, generates a signature of the literary work by a process that comprises identifying a plurality of sub-graphs of the graph, and for individual types of the sub-graphs, determining how many times the respective type of sub-graph occurs in the graph; and
    a recommendation module that, when executed, determines, in real time, in response to a user action performed during a browsing session of a user who has favorably rated a second literary work, whether to recommend the literary work to the user at least partly by comparing respective signatures of the literary work and second literary work, wherein the recommendation module is configured to compare the signature of the second literary work in real time to pre-generated signatures of a plurality of respective literary works in response to said user action.

* * * * *